UNITED STATES PATENT OFFICE.

THOMAS ARNOLD, OF VERSAILLES, ILLINOIS.

IMPROVEMENT IN HOG-CHOLERA COMPOUNDS.

Specification forming part of Letters Patent No. 208,505, dated October 1, 1878; application filed April 27, 1878.

*To all whom it may concern:*

Be it known that I, THOMAS ARNOLD, of Versailles, Brown county, Illinois, have invented a compound known as "Hog-Cholera Cure or Preventive," of which the following is a specification:

In the preparation of my medicine for the cure of hog-cholera, I first take from fifty to one hundred pounds of old iron, and, after placing the same in a tight barrel, I cover it with vinegar to a depth sufficient to fully submerge it. If the iron is in scraps weighing from one to five pounds, I then add a half-pound of nitric acid, and let the mixture stand for thirty days; but if the scraps are much larger I increase the quantity of nitric acid to one pound. When the iron cannot be obtained readily I substitute therefor a pound of solution of pernitrate of iron, and this method obviates delay. I then take a half-barrel of soap-suds made from two pounds of soap, one pound of peach-tree leaves, five pounds of quicklime, one pound of carbolic acid, and two pounds of tobacco, and one gallon of the mixture first compounded as aforesaid, or one pound of the solution of pernitrate of iron, which completes the medicine.

In administering the medicine, I mix it with the bran sifted from wheat, or its equivalent, and feed to each hog once or twice per week one quart of the medicine. The precise quantity administered within the limits prescribed should be varied, according to circumstances—as the condition and size of the animal, &c.

The strength of the mixture may also be varied, as when the iron is prepared as aforesaid, by means of scrap-iron, water may be added to that compound as its quantity becomes reduced; but if the pernitrate of iron is employed small quantities of that ingredient and water may be substituted, and soap-suds may be added to the second mixture or compound to retain the original quantity as to measure as it becomes reduced.

I claim—

A medicine for the cure of hog-cholera composed of solution of pernitrate of iron, quicklime, peach-tree leaves, tobacco, carbolic acid, and soap-suds, compounded substantially as specified.

In testimony that I claim the foregoing I have hereunto set my hand this 23d day of April, A. D. 1878.

THOMAS ARNOLD.

Witnesses:
W. S. HENRY,
W. R. BRACKENRIDGE.